UNITED STATES PATENT OFFICE.

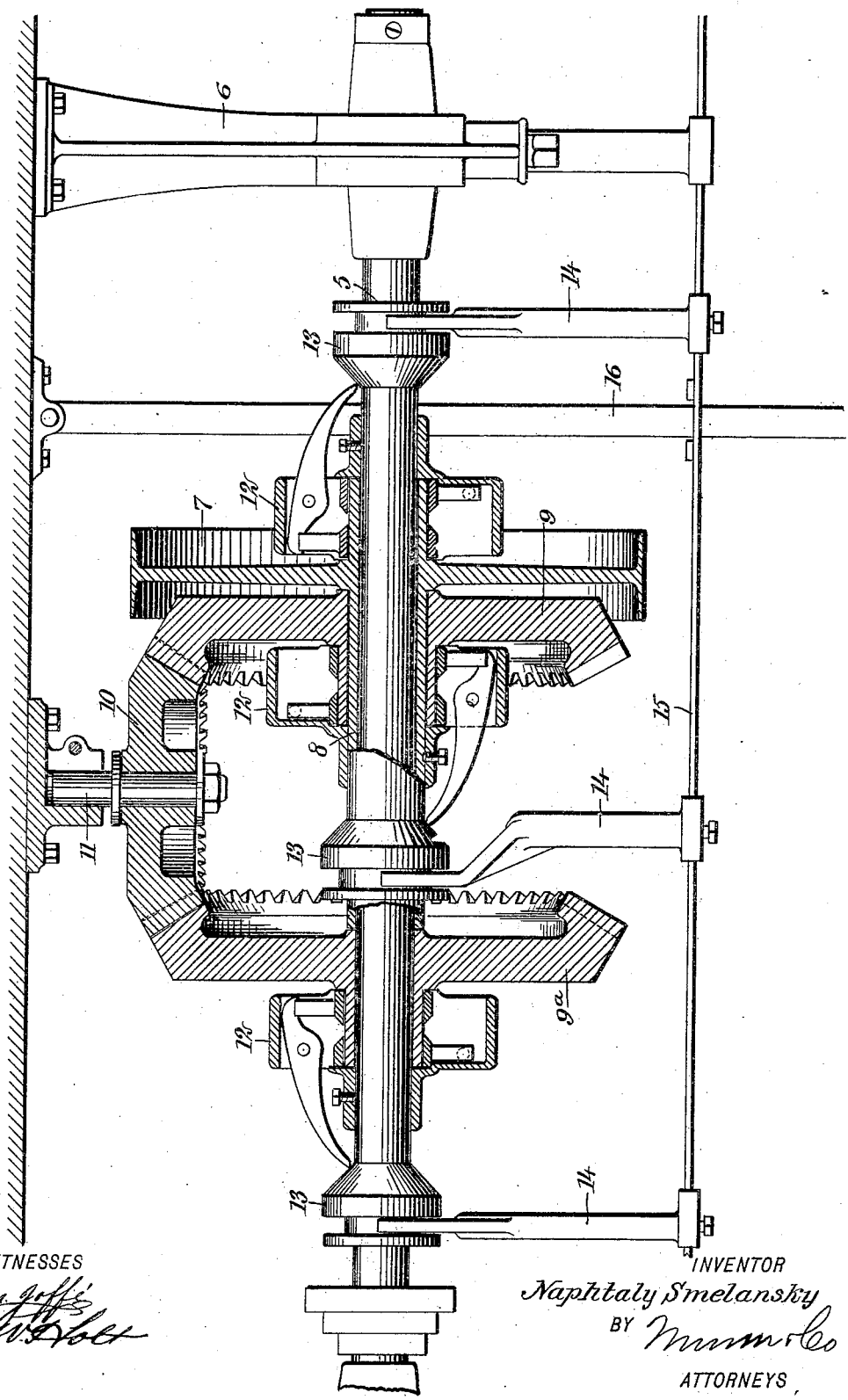

NAPHTALY SMELANSKY, OF NEW YORK, N. Y.

DRIVING MECHANISM.

934,224.                    Specification of Letters Patent.    Patented Sept. 14, 1909.

Application filed November 10, 1908. Serial No. 461,858.

*To all whom it may concern:*

Be it known that I, NAPHTALY SMELANSKY, a citizen of the United States, and a resident of the city of New York, borough of Brooklyn, in the county of Kings and State of New York, have invented a new and Improved Driving Mechanism, of which the following is a full, clear, and exact description.

The invention is an improved driving mechanism for machinery, being more especially designed for the countershaft, in which relation it replaces and performs the functions of the conventional four pulleys.

The invention in its preferred form consists, in combination with a counter or driving shaft, of a pulley journaled on the shaft having an extended hub portion, opposed bevel gears, one of which is journaled on the shaft and the other on the hub portion of the pulley, an idle bevel gear intermeshing with the opposed bevel gears, and clutches for respectively connecting the gears to the parts on which they are journaled, and the pulley to the shaft.

Reference is to be had to the accompanying drawing, wherein is represented in central vertical section my improved driving mechanism as applied to a countershaft.

A counter or driving shaft 5 is journaled in hangers 6, and suitably driven from the line shaft, as is the usual practice. On the countershaft 5 is journaled a member 7 for imparting the power to the machine, which is generally in the nature of a pulley and has an extended hub portion 8 on which a bevel gear 9 is journaled. Also journaled on the shaft 5 is a bevel gear 9ª, similar to the bevel gear 9, arranged in opposed position thereto and directly geared therewith by an idle bevel gear 10, the latter being preferably arranged in an overhead position and journaled on a pin 11 which is adjustable radially of the shaft, enabling the teeth of the gears to be brought into proper working relation. Friction clutches 12 of any suitable character are provided for respectively connecting the pulley and each of the bevel gears 9 and 9ª independently with the shaft, the friction clutches shown being of a well-known type and respectively arranged at the outer face of the pulley, the inner face of the gear 9 and the outer face of the gear 9ª, each clutch having an operating annular grooved cone 13 slidable on the shaft, and the groove of each cone is engaged by a forked arm 14, which arms are adjustably carried on a bar 15 slidably supported below the countershaft and operated by a lever 16, the arms, bar and lever constituting the shifting mechanism. The arrangement of the clutches is such that when the shifting lever 16 is moved to one of its extreme positions, the clutches are released from the gears 9 and 9ª and the remaining clutch connects the pulley directly with the driving shaft, causing the pulley to revolve in the same direction. When the shifting lever is moved to its other extreme position, the pulley clutch is thrown out and the gear clutches connect the gear 9ª directly with the shaft, and the gear 9 with the hub portion of the pulley, causing the pulley to be revolved through the gearing in the opposite direction. When the shifting lever is moved to an intermediate position, all of the clutches are thrown out as illustrated in the drawing figure, and the pulley remains idle.

Having thus described my invention, I claim as new and desire to secure by Letters Patent:

1. The combination of a driving shaft, a pulley journaled on the shaft having an extended hub portion, opposed bevel gears, one of which is journaled on the shaft and the other on the hub portion of the pulley, an idle bevel gear intermeshing with the opposed bevel gears, and clutches for respectively connecting the gears to the parts on which they are journaled, and the pulley to the shaft.

2. The combination of a driving shaft, a pulley journaled on the shaft having an extended hub portion, opposed bevel gears, one of which is journaled on the shaft and the other on the hub portion of the pulley, an idle bevel gear intermeshing with the opposed bevel gears, clutches for respectively connecting the gears and pulley with the parts on which they are journaled, and means for simultaneously throwing the gear clutches in or out and the pulley clutch out or in.

3. The combination of a driving shaft, a power-imparting member journaled on the shaft, opposed bevel wheels spaced apart and arranged on the shaft, with one of the wheels arranged adjacent to said member and the other wheel journaled on the shaft, an idler bevel wheel operatively connecting the two wheels together, a clutch to directly connect the power-imparting member with the shaft, and a clutch to connect the bevel wheel journaled on the shaft, thereto to revolve the power-imparting member in the reverse direction through the remaining bevel wheels.

4. The combination of a driving shaft, a power-imparting member journaled on the shaft, wheels arranged on the shaft and spaced apart, with one of the wheels journaled on the shaft and the other wheel journaled on said member, an idler wheel operatively connecting the wheels together, and clutches for respectively connecting the first-named wheels to the parts on which they are journaled, and the power-imparting member to the shaft.

In testimony whereof I have signed my name to this specification in the presence of two subscribing witnesses.

NAPHTALY SMELANSKY.

Witnesses:
 W. W. HOLT,
 JOHN P. DAVIS.